United States Patent Office 3,763,270
Patented Oct. 2, 1973

3,763,270
ALKYLATION IN LIQUID MEDIUM WITH HYDROGEN CHLORIDE AND FREE RADICAL GENERATING COMPOUND
Louis Schmerling, Riverside, Ill., assignor to Universal Oil Products Company, Des Plaines, Ill.
No Drawing. Filed Dec. 27, 1971, Ser. No. 212,709
Int. Cl. C07c 3/52, 3/54
U.S. Cl. 260—683.47         10 Claims

ABSTRACT OF THE DISCLOSURE

Gaseous alkylated hydrocarbons may be alkylated with an olefinic hydrocarbon by effecting the reaction in the presence of a hydrogen chloride compound and a catalyst comprising a free radical generating compound at a temperature at least as high as the decomposition temperature of the catalyst, said reaction also being effected in a liquid saturated hydrocarbon medium.

---

This invention relates to a process for the alkylation of normally gaseous saturated hydrocarbons. More particularly this invention is concerned with a process for alkylating normally gaseous saturated hydrocarbons with an olefinic hydrocarbon in the presence of a hydrogen chloride compound and a free radical generating compound which acts as a catalyst, the yield of the desired product being improved by utilizing liquid saturated hydrocarbons as a solvent for the gaseous paraffin.

It is a well-known fact that many chemical compounds are more desirable for various reactions than others. The relatively low molecular weight hydrocarbons and particularly normally gaseous saturated hydrocarbons are more plentiful in supply, but may not be useful as such or as reactants for producing desired compounds. They may be converted to useful and desired compounds by the process of this invention. For example, said normally gaseous saturated hydrocarbons are found in flue gases and other sources. However, the value of these compounds is insignificant when compared to other compounds. Neohexane (2,2-dimethylbutane), which is useful as a component in motor and aviation fuels where very high octane ratings are desirable, may be prepared according to the process hereinafter set forth in greater detail by utilizing certain starting materials, both of which are in plentiful supply. In addition by employing the process of this invention, it is possible to obtain improved yields of the desired product.

It is therefore an object of this invention to provide a process for the alkylation of normally gaseous saturated hydrocarbons utilizing an olefinic hydrocarbon as the alkylating agent.

A further object of this invention is to provide a process for the alkylation of saturated normally gaseous hydrocarbons utilizing a free radical generating compound as the catalyst.

In one aspect an embodiment of this invention resides in a process for the alkylation of a gaseous saturated hydrocarbon which comprises treating said hydrocarbon with an olefinic hydrocarbon in a liquid saturated hydrocarbon medium, said reaction being effected in the presence of a hydrogen chloride compound and a catalyst comprising a free radical generating compound at reaction conditions, and recovering the resultant alkylated saturated hydrocarbon.

A specific embodiment of this invention is found in a process for the alkylation of isobutane which comprises treating said isobutane with ethylene in a medium comprising n-dodecane, said reaction being effected in the presence of hydrochloric acid and di-t-butyl peroxide at a temperature at least as high as the decomposition temperature of said di-t-butyl peroxide, and recovering the resultant 2,2-dimethylbutane.

Other objects and embodiments will be found in the following further detailed description of the present invention.

As hereinbefore set forth the present invention is concerned with a process for obtaining improved yields of alkylate from saturated hydrocarbons which are normally gaseous in nature. The obtention of improved yields is effected by treating the normally gaseous saturated hydrocarbons with an alkylating agent in a liquid paraffinic hydrocarbon medium, the reaction being catalyzed by a free radical generating compound. Suitable normally gaseous saturated hydrocarbons which may be alkylated according to the process of this invention will contain at least 3 carbon atoms and possess a secondary or tertiary carbon atom, said normally gaseous saturated hydrocarbons comprising propane, n-butane and isobutane.

Olefinic hydrocarbons which may be used as alkylating agents in the process of this invention will include olefins containing from 2 up to about 10 carbon atoms in length, being straight chain, branch chain and cyclic in configuration. Some representative examples of these olefins will include ethylene, propene, 1-butene, 2-butene, 1-pentene, 2-pentene, 1-hexene, 2-hexene, 3-hexene, 1-heptene, 2-heptene, 3-heptene, 1-octene, 2-octene, 3-octene, 4-octene, as well as the isomeric straight chain nonenes and decenes, 2-methylpropane (isobutylene), 2-methyl-1-butene, 2-methyl-2-butene, 2-methyl-1-pentene, 2-methyl-1-hexene, 2-methyl-1-heptene, 2-methyl-1-octene, 2,3-dimethyl-1-pentene, 2,3-dimethyl-1-hexene, cyclopentene, cyclohexene, etc. Of the aforementioned olefins the preferred alkylating agents will include those which are of straight-chain configuration and are also normally gaseous in nature such as ethylene, propene and the n-butylenes.

The catalysts which may be used in the present process are those which are capable of forming free radicals under the reaction conditions. These include peroxy compounds containing the bivalent radical, —O—O—, which decompose to form free radicals which initiate the general reaction of the present invention and which are capable of inducing the alkylation of the saturated hydrocarbon with the olefinic hydrocarbon. Examples of these catalysts include the persulfates, perborates, percarbonates of ammonium and of the alkali metals, and organic peroxy compounds. The organic peroxy compounds constitute a preferred class of catalysts for use in the invention and include peracetic acid, persuccinic acid, dimethyl peroxide, diethyl peroxide, dipropyl peroxide, di-t-butyl peroxide, butyryl peroxide, lauroyl peroxide, benzoyl peroxide, tetralin peroxide, urea peroxide, t-butyl perbenzoate, t-butyl hydroperoxide methylcyclohexyl hydroperoxide, cumene, hydroperoxide, diisopropylbenzyl hydroperoxide, etc. Mixtures of peroxy compound catalysts may be employed or the peroxy compound catalyst may be utilized in admixture with various diluents. Thus, organic peroxy compounds which are compounded commercially with various diluents which may be used include benzoyl peroxide compounds with calcium sulfate, benzoyl peroxide compounded with camphor, etc. Only catalytic amounts (less than stoichiometric amounts) need be used in the process.

The reaction of the present process involving the aforementioned starting materials is effected at elevated reaction temperatures which should be at least as high as the initial decomposition temperature of the radical generating catalyst, such as the peroxide compound, in order to liberate and form free radicals which promote the reaction. In selecting a particular reaction temperature for use in the process of the present invention, two considerations must be taken into account. First, sufficient enegy by means of heat must be supplied to the reaction so that the reactants, namely saturated hydrocarbons and olefinic hydrocarbons, will be activated sufficiently for condensation to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 35% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for condensation. When the half life of the free radical generating catalyst is greater than 20 hours, radicals are not generated at a sufficient rate to cause the reaction of the process of the present invention to go forward at a practical rate. Thus the reaction temperature may be within the range of from about 50° to about 300° C. and at least as high as the decomposition temperature of the catalyst, by which is meant a temperature such as the half life of the free radical generating catalyst is not greater than 20 hours. Since the half life for each free radical generating catalyst is different at different temperatures, the exact temperature to be utilized in a particular reaction will vary. However, persons skilled in the art are well acquainted with the half life vs. temperature data for different free radical generating catalysts. Thus it is within the skill of one familiar with the art to select the particular temperature needed for any particular catalyst. However, the operating temperatures generally do not exceed the decomposition temperature of the catalyst by more than about 150° C. since free radical generating catalysts decompose rapidly under such conditions. For example, when a free radical generating catalyst such as t-butyl perbenzoate is used, having a decomposition temperature of approximately 115° C., the operating temperature of the process is free about 115° to about 265° C. When di-t-butyl peroxide having a decomposition temperature of about 130 C. is used, the process is run at a temperature ranging from about 130° to about 280° C. Higher reaction temperatures may be employed, but little advantage is gained if the temperature is more than the hereinbefore mentioned 150° C. higher than the decomposition temperature of the catalyst. The general effect of increasing the operating temperature is to accelerate the rate of the condensation reaction between the saturated hydrocarbon and the olefinic hydrocarbon. However, the increased rate of reaction is accompanied by certain amounts of decomposition. In addition to the elevated temperatures which are utilized the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention. However, because of the low boiling points of some of the reactants it is necessary to utilize pressure withstanding equipment to insure liquid phase conditions. In batch type operations it is often desirable to utilize pressure with standing equipment, to charge the reactants and catalyst to the vessel, and to pressure the vessel with 10, or 30 or 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Furthermore, the concentration of the catalyst employed in this process may vary over a rather wide range but it is desirable to utilize low concentrations of catalysts such as from about 0.1% to about 10% of the total weight of the combined starting materials charged to the process. The reaction time may be within the range of from less than one minute to many hours, depending upon temperature and half life of the catalyst. Generally speaking, contact times of at least 10 minutes are preferred.

As hereinbefore set forth the alkylation of the saturated hydrocarbon with the olefinic hydrocarbon in the presence of the aforesaid catalysts is made feasible by the presence of a hydrogen chloride compound in the reaction mixture. The hydrogen chloride compound may be present as anhydrous hydrogen chloride, as concentrated hydrochloric acid or as an aqueous solution of hydrochloric acid, the hydrogen chloride being present in an amount of 5% to 38% in said aqueous solution.

As will be hereinafter shown in greater detail it is possible to obtain improved yields of the desired product comprising an alkylated saturated hydrocarbon by effecting the reaction in a normally liquid saturated hydrocarbon medium. The preferred liquid hydrocarbons comprise straight chain alkanes containing from 5 to about 12 carbon atoms in length, specific examples of these compounds include n-pentane, n-heptane, n-octane, n-nonane, n-decane, n-undecane, n-dodecane. Cycloalkanes such as cyclopentane, cyclohexane and decahydronaphthalene may also be used. Of these compounds the higher boiling alkanes such as n-decane, n-undecane or n-dodecane are preferred over the lower boiling compounds such as n-pentane, n-heptane, n-octane due to the fact that the alkylate which comprises the desired product is more readily separable from the solvent due to the larger difference in boiling point when utilizing distillation as the separating means. It is also contemplated within the scope of this invention that paraffin containing gem dialkyl groups such as di-t-butyl or 2,2,4-trimethylpentane may also be utilized as solvent medium, although not necessarily with equivalent results.

The process of this invention may be effected in any suitable manner and may comprise either a batch or continuous type of operation. For example when a batch type operation is used, a quantity of the solvent, the catalyst comprising a free radical generating compound and the hydrogen chloride compound are placed in an appropriate apparatus, such as, for example, an autoclave of the rotating or mixing type. The normally gaseous saturated hydrocarbon and the olefinic hydrocarbon which acts as an alkylating agent are thereafter charged to the reactor. The olefinic hydrocarbon which acts as an alkylating agent may be present in the reaction mixture in an amount in the range of from about 1:1 to about 10:1 moles of saturated hydrocarbon per mole of olefinic hydrocarbon. If anhydrous hydrogen chloride is used as the hydrogen chloride compound, it is added with the other gases, usually in a separate line. Following the charge of the reactants to the reactor it is thereafter heated to the desired operating temperature, which as hereinbefore set forth, is at least as high as the decomposition temperature of the free radical generating compound which acts as the catalyst for this reaction and is preferably in a range from the aforesaid decomposition temperature to 150° C. higher than the decomposition temperature. Upon completion of the desired residence time which may be in a range of from about 0.5 up to about 10 hours or more in duration, heating is discontinued, and the reactor is allowed to return to room temperature. The excess pressure is discharged, the autoclave is opened and the reaction mixture is recovered therefrom. This mixture is then subjected to conventional means of separation such as washing, drying, and fractional distillation whereby the desired alkylated saturated hydrocarbon is separated and recovered from any hydrogen chloride compound, water and solvent, etc.

It is also contemplated within the scope of this invention that the alkylation of the normaly gaseous saturated hydrocarbon with the olefinic hydrocarbon may be effected in a continuous manner of operation. When such a type of operation is utilized the normally gaseous saturated hydrocarbon and the olefinic hydrocarbon are continuously charged to a reaction zone which is maintained at the suitable operating conditions of temperature and pressure, the catalyst, the hydrogen chloride compound and the liquid paraffinic hydrogen solvent also being continuously charged to said reaction zone. While the reactants may be charged to the reaction zone through separate lines, it is also possible to admix the reactants and catalysts and solvent prior to entry into said reaction zone and charge the mixture thereto in a single stream; the hydrogen chloride compound being usually charged in a separate stream. Alternatively one or both of the reactants may be carried to the reaction zone in the paraffinic hydrogen solvent while the catalyst is added separately, often in an additional amount of the hydrogen solvent. Upon completion of the desired residence time is also in a range hereinbefore set forth the reactor effluent is continuously removed and subjected to conventional means of separation whereby the desired product is recovered, the unreacted starting material comprising the normally gaseous saturated hydrocarbon and the olefinic hydrocarbon being recycled to the reaction zone to form a portion of the feed stock along with the solvent and any hydrogen chloride compound.

The following examples are given to illustrate the process of the present invention which, however, are not intended to limit the generally broad scope of the present invention in strict accordance therewith.

EXAMPLE I

In this example 6 grams of di-t-butyl peroxide, 25 grams of concentrated hydrochloric acid and 25 grams of water were placed in the glass liner of a rotating autoclave. The autoclave was sealed and propane and ethylene pressed into said autoclave until an initial operating pressure of 40 atmospheres was reached. This pressure consisted of 10 to 12 atmospheres of propane and 28 to 30 atmospheres of ethylene. The autoclave was then heated to a temperature of 130° C. and maintained in a range of from 130° to 140° C. for a period of 4 hours, the maximum pressure at this temperature rising to 76 atmospheres. At the end of the 4-hour period heating was discontinued and the autoclave was allowed to return to room temperature. After reaching room temperature the excess pressure was discharged and the reactor was opened. The reaction product was recovered, there being less than 1 gram of normally liquid hydrocarbon product recovered.

EXAMPLE II

In this example the above experiment was repeated utilizing a normally liquid paraffinic hydrocarbon solvent. To accomplish this, 6 grams of di-t-butyl peroxide, 27 grams of concentrated hydrochloric acid and 29 grams of water along with 17 grams of n-heptane were placed in the glass liner of a rotating autoclave. The autoclave was sealed and a mixture of propane (75 grams, 10 atmospheres) and ethylene (30 atmospheres) was charged thereto. The autoclave was then heated to a temperature of 130° C. and maintained in a range of from 130° to 140° C. for a period of 4 hours, the maximum pressure at this temperature reaching 66 atmospheres. At the end of the 4-hour period heating was discontinued, the autoclave was allowed to return to room temperature and the final pressure which was 20 atmospheres was discharged.

The autoclave was opened and the reaction mixture which was recovered therefrom consisted of 41 grams of organic upper layer and 54 grams of aqueous layer.

The reaction product was washed, dried and subjected to analysis. The gas-liquid chromatographic analysis disclosed that besides the n-heptane solvent the product contained pentanes (about 81% isopentane) and heptanes (2,3- and 3,3-dimethylpentane). Only a minor amount of the n-heptane (used in a smaller amount than propane) underwent alkylation to form 2-methylhexane and 3-ethylpentane. The yields of pentane was equivalent to 5% of the theoretical yield, that of the dimethylpentanes to 3%. The pentanes and heptanes were again the major products when a higher-boiling solvent n-dodecane (11 grams) was used as the solvent instead of n-heptane in the above experiment.

EXAMPLE III

In this example 6 grams of di-t-butyl peroxide, 32 grams concentrated hydrochloric acid and 32 grams of water were placed in the glass liner of a rotating autoclave along with 51 grams of n-heptane. The autoclave was sealed and a mixture comprising 100 grams of isobutane (10 atmospheres), 25 atmospheres of ethylene and 10 atmospheres of nitrogen was charged to the reactor. The reactor was then heated to a temperature of 130° C' and maintained in a range of from 130° to 140° C. for a period of 4 hours, the maximum pressure at this temperature reaching 62 atmospheres. At the end of the 4-hour period, heating was discontinued and the autoclave allowed to return to room temperature, the final pressure at room temperature being 26 atmospheres. This excess pressure was then discharged and the autoclave was opened. The reaction product was recovered therefrom and the upper layer (82 grams) was washed and dried. After silica-gel separation of the saturated hydrocarbons, the product was subjected to gas-liquid chromatographic analysis which disclosed the presence of 2,2-dimethylbutane as well as a minor portion of 2-methylpentane When the above experiment was repeated omitting the presence of the normally liquid paraffinic liquid solvent such as n-heptane, the recovered product weighed only 6 grams as compared to the 31 grams of product (solvent-free weight) which was obtained when utilizing the solvent.

EXAMPLE IV

In this example 6 grams of benzoyl peroxide along with 25 grams of concentrated hydrochloric acid and 25 grams of water are placed in the glass liner of a rotating autoclave. The autoclave is sealed and a mixture of n-butane and ethylene is charged thereto until an initial operating pressure of 40 atmosphers is reached, said pressure consisting of 10 atmospheres of n-butane and 30 atmospheres of ethylene. The autoclave is then heated to a temperature of 130° C. and maintained in a range of 130° to 140° C. for a period of 4 hours, the maximum pressure at this temperature being approximately 70 atmospheres. Upon completion of the 4-hour residence period heating is discontinued and the autoclave allowed to return to room temperature. The excess pressure is discharged and the autoclave is opened. The reaction product comprising an upper layer and a lower layer is recovered and the upper layer after separation is washed, dried and subjected to analysis by means of gas-liquid chromatography. This analysis will disclose the present of the monoethylation product comprising a mixture of 3-methylpentane together with a smaller amount of n-hexane.

EXAMPLE V

A mixture consisting of 25 grams of n-dodecane, 6 grams of di-t-butyl peroxide and 25 grams of concentrated hydrochloric acid is placed in the glass liner of a rotating autoclave which is thereafter sealed. A charge stock comprising a mixture of 100 grams of isobutane and 20 grams of propene is charged to the reactor which is thereafter heated to a temperature of 130° C. The reactor is maintained at a temperature in the range of 130° to 140° C. for a period of 4 hours. At the end of the residence time heating is discontainued, the autoclave is allowed to return to room temperature and the excess pressure is discharged. The autoclave is opened and the reaction product comprising an upper layer and a lower layer is recovered and separated, following which the upper layer is washed, dried and subjected to gas-liquid chromatographic analysis. This analysis will confirm the presence of the alkylated saturated hydrocarbon product which is 2,2-dimethylpentane.

I claim as my invention:

1. A process for the alkylation of a gaseous saturated hydrocarbon selected from the group consisting of propane, n-butane and isobutane which comprises reacting said hydrocarbon with an olefinic hydrocarbon in a liquid saturated hydrocarbon medium of from 5 to about 12 carbon atoms per molecule, said alkylation being effected in the presence of hydrogen chloride and a free radical generating compound selected from the group consisting of the persulfates, perborates and percarbonates of ammonium and the alkali metals, and organic peroxy compounds, said alkylation being effected at a temperature of from about 50° to about 300° C..

2. The process of claim 1 further characterized in that said free radical generating compound is an organic peroxide.

3. The process as set forth in claim 1, in which said hydrogen chloride is in the form of hydrochloric acid.

4. The process as set forth in claim 2 in which said organic peroxide is di-t-butyl peroxide.

5. The process as set forth in claim 2 in which said organic peroxide is benzoyl peroxide.

6. The process as set forth in claim 1 in which said liquid saturated hydrocarbon is n-dodecane.

7. The process as set forth in claim 1 in which said gaseous saturated hydrocarbon is propane, said olefinic hydrocarbon is ethylene, and said liquid saturated hydrocarbon comprises isopentane.

8. The process as set forth in claim 1 in which said gaseous saturated hydrocarbon is isobutane, said olefinic hydrocarbon is ethylene, and said liquid saturated hydrocarbon comprises 2,2-dimethylbutane.

9. The process as set forth in claim 1 in which said gaseous saturated hydrocarbon is n-butane, said olefinic hydrocarbon is ethylene, and said liquid saturated hydrocarbon comprises 3-methylpentane.

10. The process as set forth in claim 1 in which said gaseous sataurated hydrocarbon is isobutane, said olefinic hydrocarbon is propene, and said liquid saturated hydrocarbon comprises 2,2-dimethylpentane.

References Cited
UNITED STATES PATENTS

| | | | |
|---|---|---|---|
| 2,909,581 | 10/1959 | Frech et al. | 260—683.43 |
| 2,410,070 | 10/1946 | Horton | 260—683.47 |
| 2,410,107 | 10/1946 | Sachanen et al. | 260—683.47 |

DELBERT E. GANTZ, Primary Examiner

G. J. CRASANAKIS, Primary Examiner

U.S. Cl. X.R.

260—683.58